Oct. 24, 1950        H. P. BOGGIS        2,526,844
TAP GRINDING MACHINE

Filed May 14, 1948        4 Sheets-Sheet 1

INVENTOR
*Henry P. Boggis*
BY
*Evans & McCoy*
ATTORNEYS

Oct. 24, 1950           H. P. BOGGIS           2,526,844
TAP GRINDING MACHINE
Filed May 14, 1948           4 Sheets-Sheet 3
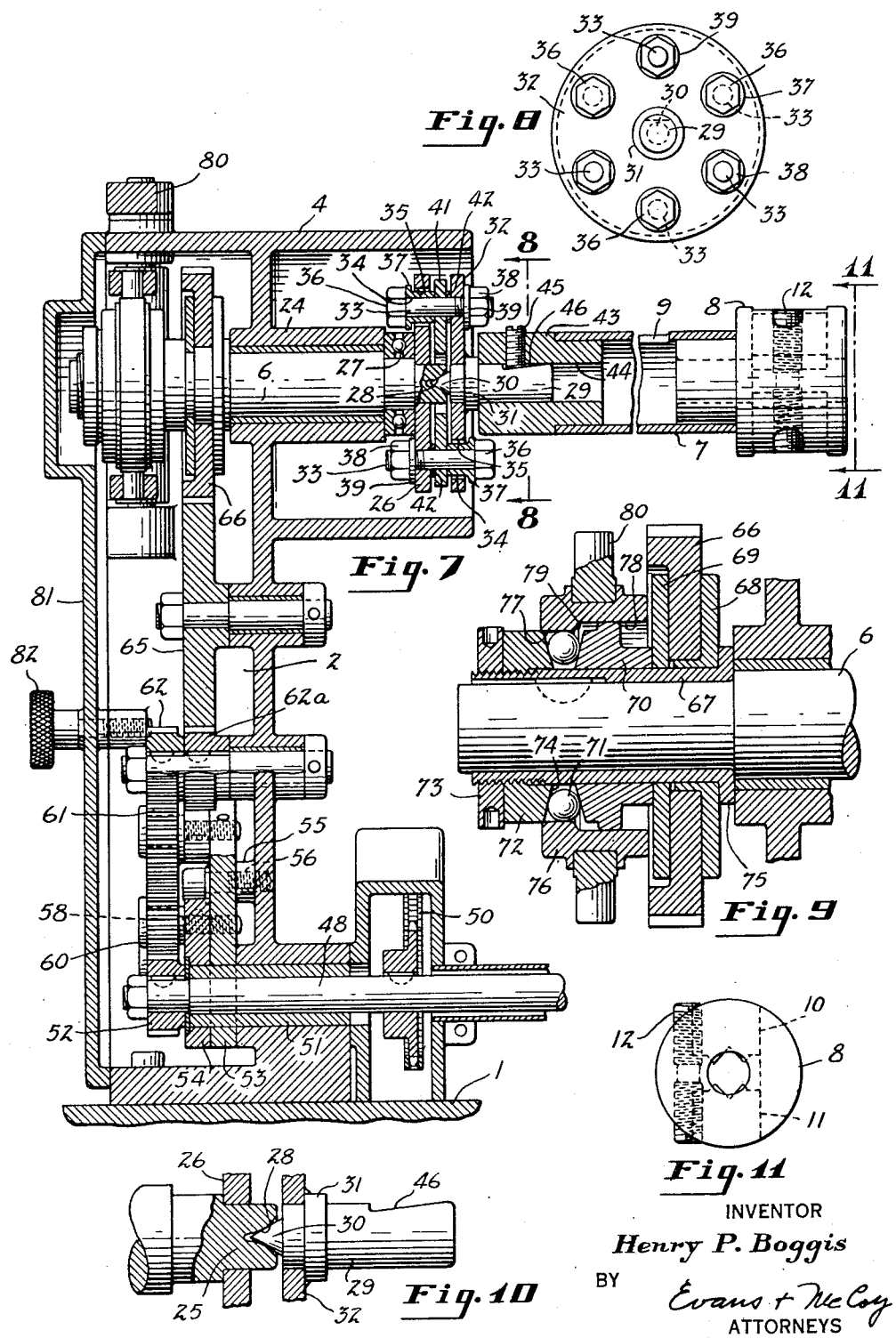
INVENTOR
Henry P. Boggis
BY
Evans & McCoy
ATTORNEYS

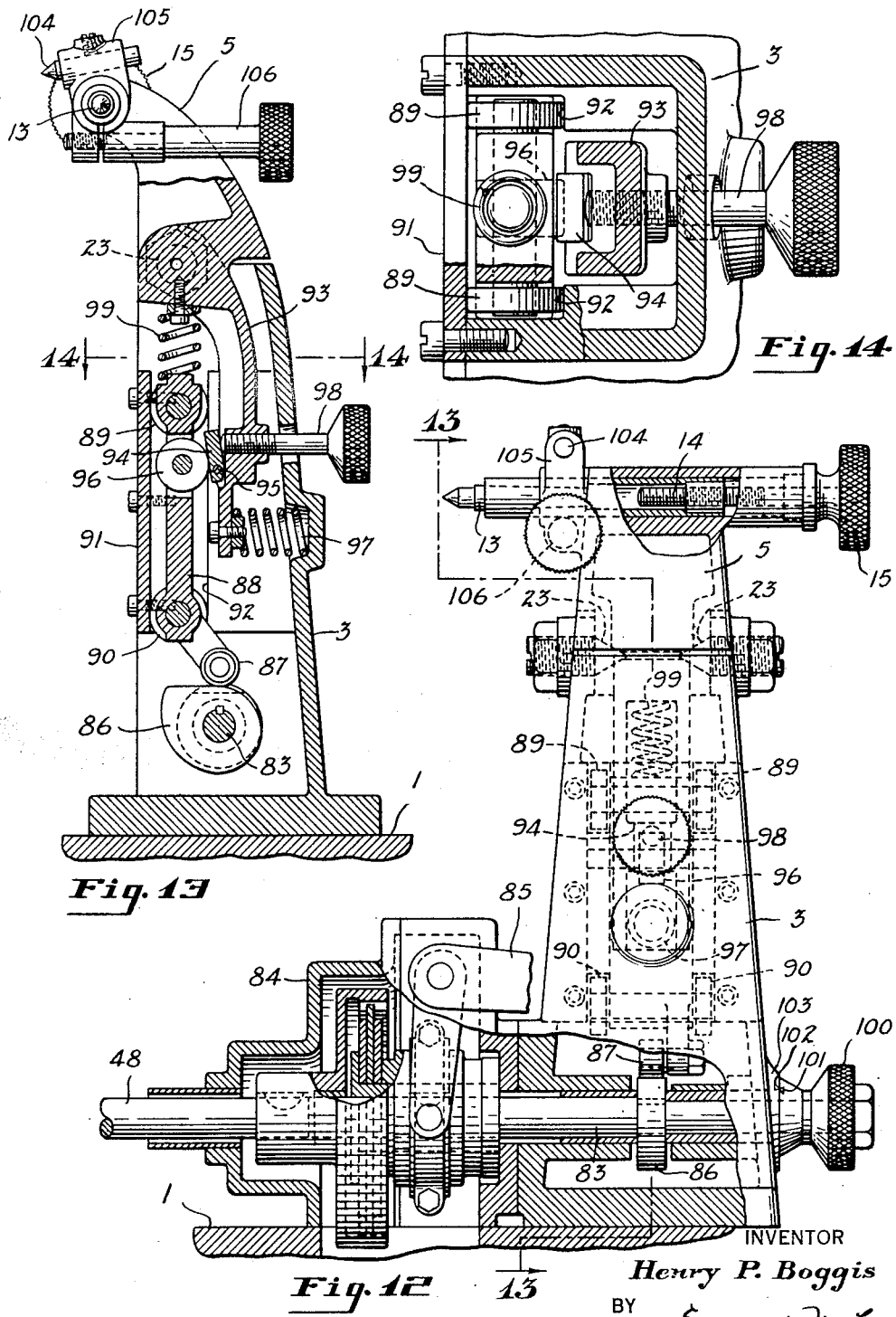

Patented Oct. 24, 1950

2,526,844

UNITED STATES PATENT OFFICE 2,526,844

TAP GRINDING MACHINE

Henry P. Boggis, Shaker Heights, Ohio

Application May 14, 1948, Serial No. 27,110

11 Claims. (Cl. 51—97)

This invention relates to a machine for generating the radially relieved circumferential faces of cutting tools and particularly to a grinding machine for grinding the radially relieved circumferential faces of taps.

The invention has for an object to provide a machine of the character referred to in which the work is oscillated laterally with respect to generating cutting elements such as a grinding wheel in timed relation to the rotation of the work spindle by means of mechanism geared to the work spindle and including a clutch or the like by means of which the work oscillating mechanism may be disconnected from the spindle to permit manual adjustment of the work relative to the grinding wheel.

A further object of the invention is to provide a driving connection between the work spindle and the spindle oscillating mechanism that includes gearing of the ratio varying type so that the desired number of oscillations of the work during a rotation of the spindle may be provided.

A further object is to provide a driving connection of the direction reversing type so that radial relief may be provided for right or left-hand taps.

An additional object is to provide means for quickly and easily varying the amplitude of oscillation of the work spindle with respect to the cutting tool so as to increase or decrease the amount of radial relief.

Other objects will be apparent from the following description.

Reference should be had to the accompanying drawings forming a part of this specification in which.

Figure 1:
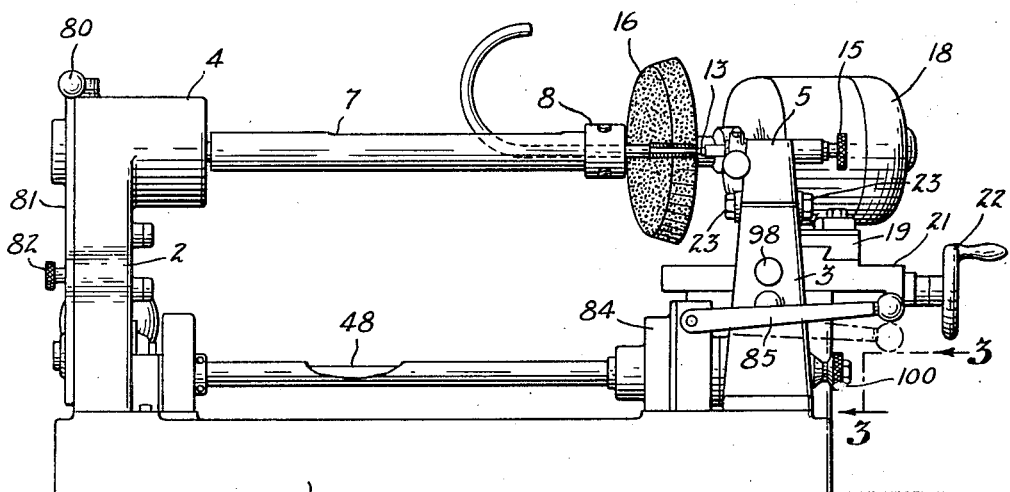
Figure 1 is a front elevation of a machine embodying the invention.
Figure 2:
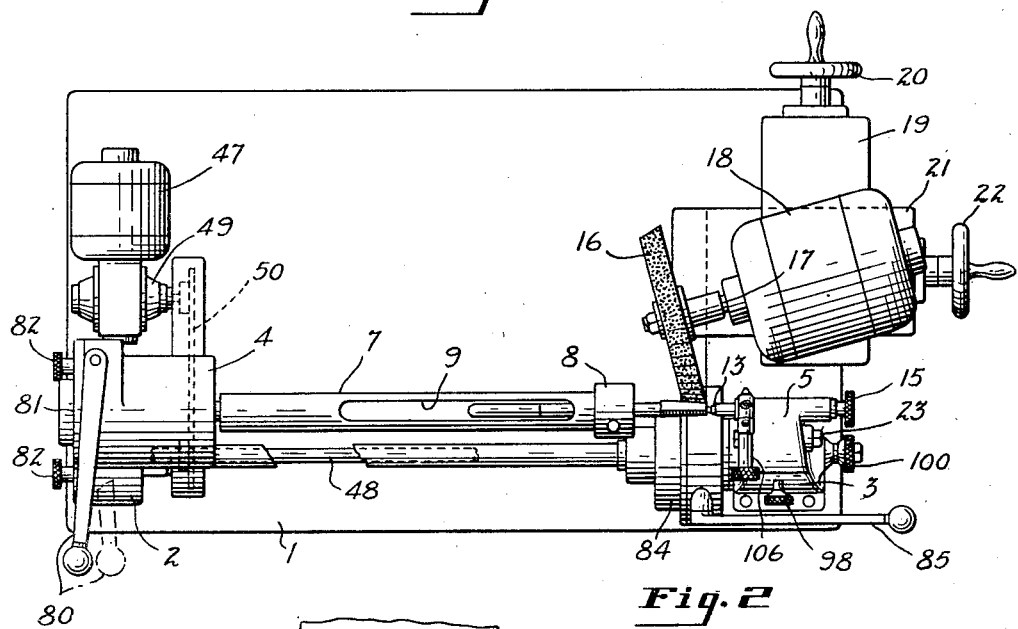
Fig. 2 is a top plan view of the machine shown in Fig. 1.
Figure 3:
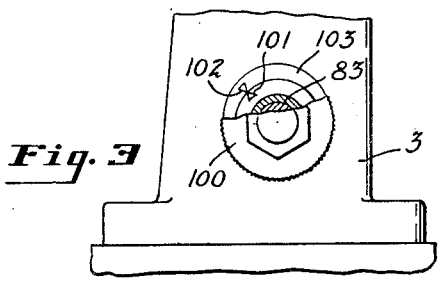
Fig. 3 is a fragmentary end elevation of the machine viewed as indicated at 3—3 in Fig. 1.
Figure 5:
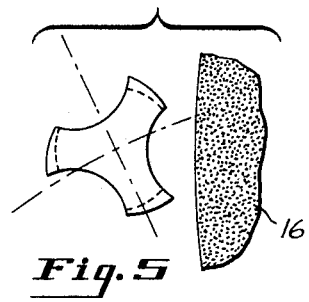
Figure 6:
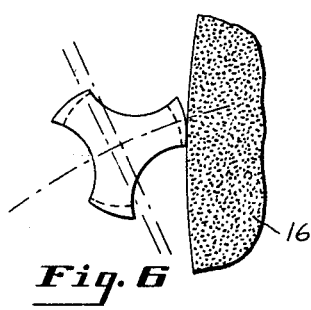
Figure 4:
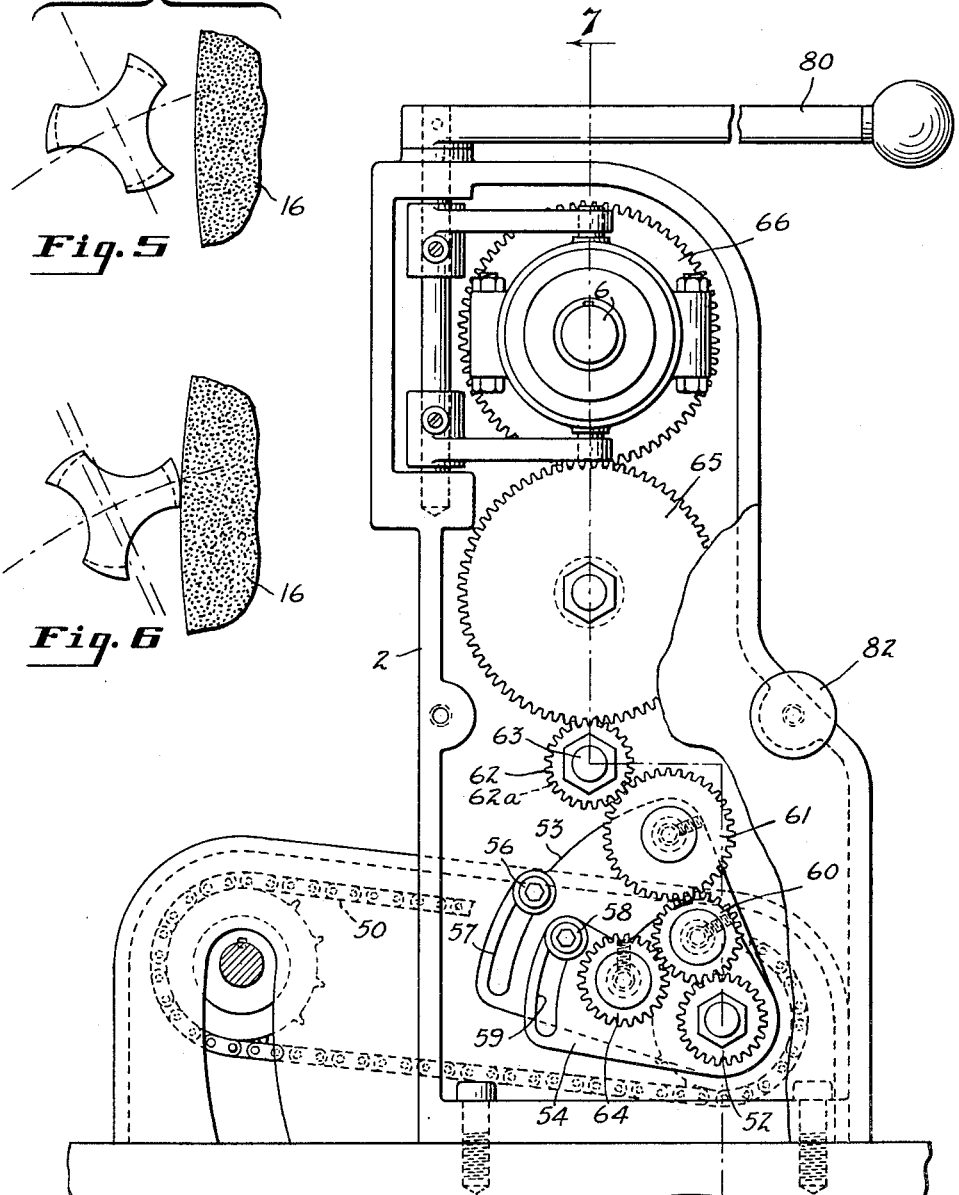
Fig. 4 is an end elevation looking toward the headstock end of the machine with a portion of the housing broken away to show the spindle driving mechanism.

Figs. 5 and 6 are diagrammatic views showing the manner in which a workpiece such as a tap is moved with respect to a generating cutting element such as a grinding wheel during the operation of the machine, Fig. 5 showing the position of the tap relative to a grinding wheel at the beginning of the grinding operation on one of the relieved peripheral faces of the tap, and Fig. 6 showing the relative positions of the tap and grinding wheel at the end of the grinding operation on the said peripheral face;

Fig. 7 is a vertical section taken on the line indicated at 7—7 in Fig. 4;

Fig. 8 is an elevation of the flexible coupling shown in Fig. 7 viewed as indicated at 8—8 in Fig. 7;

Fig. 9 is a sectional view showing the clutch on a somewhat enlarged scale;

Fig. 10 is a fragmentary view showing the centering connection between the sections of the work spindle which have relative pivotal movements;

Fig. 11 is an end view of the work holding section of the spindle viewed as indicated at 11—11 in Fig. 7;

Fig. 12 is a fragmentary front elevation of the tailstock and its supporting standard with parts broken away and shown in section;

Fig. 13 is a transverse vertical section through the tailstock taken on the line indicated at 13—13 in Fig. 12; and Fig. 14 is a horizontal section through the tailstock supporting standard taken on the line indicated at 14—14 in Fig. 13.

In the accompanying drawings the invention is shown applied to a machine suitable for the grinding of taps, the frame of the machine comprising an elongated base 1 and hollow standards 2 and 3 adjacent opposite ends of the base, the standards 2 and 3 providing supports for a headstock 4 and a tailstock 5. The headstock 4 has a spindle section 6 journaled therein to which is flexibly and detachably secured an elongated work holding spindle section 7. The work holding section 7 is tubular in form and has a suitable work holding chuck 8 at its free end. The work holding spindle section herein shown is particularly designed to receive workpieces such as taps having elongated hook-shaped shanks. The tubular section 7 has an elongated longitudinal slot 9 that is wide enough to receive the head of a tap to be ground, and the chuck 8 is provided with movable jaws 10 and 11 that can be moved apart sufficiently to permit the head of a tap to be advanced through the chuck from the interior of the hollow spindle. As herein shown, the jaws 10 and 11 are actuated by a screw 12 that has portions with oppositely inclined threads engaging the jaws so that the jaws are moved apart when the screw is turned in one direction and may be moved inwardly to clamp the shank of a tap by turning the screw in the opposite direction.

The tailstock 5 carries an axially adjustable center 13 that is adapted to be advanced or retracted by means of a screw 14 operating by a handle 15 to engage or release a tap clamped in the chuck 8.

A suitable grinding wheel 16 mounted on the shaft 17 of an electric motor 18 is mounted for universal adjustment adjacent the work holding portion of the spindle. The motor 18 carrying the grinding wheel 16 is mounted for angular adjustment about a vertical axis on a slide 19 that is adapted to be moved transversely of the work spindle by means of a screw operating handwheel 20. The slide 19 is mounted upon a second slide 21 that is supported on the frame for movement longitudinally of the work spindle by means of a screw operating handwheel 22.

The tailstock 5 is mounted on trunnions 23 carried by the standard 3 adjacent its upper end, the trunnions 23 supporting the tailstock for pivotal movement about a horizontal axis substantially parallel to the axis of the center 13. The pivotal mounting of the tailstock 5 permits the work to be moved laterally with respect to the grinding wheel 16 during the operation of the machine, as indicated in Figs. 5 and 6 of the drawings.

As shown in Fig. 7 of the drawings, the headstock 4 has a bearing portion 24 in which the spindle section 6 is journaled. The section 6 has an outer end 25 of reduced diameter to which a disk 26 is rigidly attached and a ball thrust bearing 27 is imposed between the disk 26 and the outer end of the bearing portion 24 of the headstock, the bearing 27 serving to take the end thrust applied to the spindle by the center 13. In order to permit the work holding end of the spindle to have lateral movement, the work holding section 7 is flexibly connected to the section 6 of the spindle, and in order to provide a centering pivotal connection the reduced end 25 of the spindle section 6 is provided with a tapering socket 28, the wall of which is convexly curved in axial section.

A short attaching section 29 is provided with a conical end portion 30 that seats in the tapered socket 28 and has rocking movement on the convex wall thereof. The end 30 of the attaching section can rock laterally in any direction in the socket 28 so that the attaching section 29 can swing about a substantially fixed point at the axis of the section 6 of the spindle during operation of the machine, the section 29 being attached to the section 6 by a suitable flexible coupling that will permit the section 29 to have a slight angular movement about said fixed point. The attaching section 29 has a circumferential rib 31 and on the outer side of the rib 31 a flat disk 32 is rigidly attached thereto. The disks 26 and 32 are connected by means of a series of circumferentially spaced bolts 33 that serve to hold the conical point 30 in engagement with the tapered socket 28. Each of the bolts 33 has a flanged metal bushing 34 thereon and the bushings 34 are received in holes 35 formed in the disks 26 and 32 that are of a diameter slightly greater than that of the bushings. Each of the bolts has a head 36 and the bushing 34 on each bolt has a flange 37 engaging the head 36, and a nut 38 and a washer 39 at the opposite end. Successive bolts are oppositely positioned so that bushings 34 of alternate bolts extend through the openings 35 of each of the plates 26 and 32. The openings 35 permit small angular movements of the attaching section 29 with respect to the section 6 of the spindle. A flexible spacer disk 41, preferably formed of fabric impregnated with rubber, is positioned between the disks 26 and 32 and is clamped by the bolts 33 between the bushings 34 and suitable spacing washers 42 that are interposed between the disk 41 and the disks 26 and 32. The bushings 34 are of a length to space the disk 41 from the inner faces of the disks 26 and 32 and to space the flanges 37 from the outer faces of the disks 26 and 32. Flexing of the disk 41 and the lateral play of the bushings 34 in the openings 35 permits small relative angular movements of the spindle sections.

The work holding section 7 has a coupling member 43 attached to its inner end and the coupling member 43 is provided with an axial bore 44 of a size to fit upon the outer end of the attaching section 29 and a radially disposed screw 45 engages a tapering recess 46 in the attaching section 29 to securely clamp the work holding section 7 to the attaching section 29. The centered flexible connection permits sufficient angular movement of the attaching section 29 to provide for the desired lateral movement of the work mounted at the outer end of the elongated work holding section 7. To detach the work holding section from the fixed portion of the spindle it is only necessary to loosen the screw 45 and slip the section 7 off the short attaching section 29. The work holding spindle section 7 can be readily replaced with another, and by providing a number of the tubular work holding sections, taps to be ground may be clamped in the work holding sections before they are attached to the fixed portion of the spindle, thereby enabling the operator to mount taps in chucks of detached spindles while the machine is in operation, thereby lessening the time during which the machine is idle between the grinding of successive taps.

Suitable driving means such as a constant or variable speed electric motor 47 is provided for rotating the work spindle. The motor 47 is mounted on the base of the machine and drives a horizontal shaft 48 that extends longitudinally of the base between the standards 2 and 3. The motor 47 drives the shaft 48 through suitable reduction gearing in a housing 49 and through a sprocket chain 50.

As shown in Fig. 7, the shaft 48 is journaled in a bearing sleeve 51 in the base portion of the standard 2, and within the hollow standard 2 the shaft 48 has attached thereto a gear 52 that drives the work spindle through gearing housed within the hollow standard 2. The gearing through which the spindle is driven is preferably of the ratio varying and reversible type consisting of a gear train in which certain of the gears are replaceable with gears of different sizes to vary the speed ratio and in which certain of the gears are adjustable to reverse the direction of rotation of the spindle.

As herein shown the adjustable and interchangeable gears are mounted upon two angularly adjustable gear supporting plates 53 and 54 pivotally mounted upon the bearing sleeve 51. The gear plate 53 is secured in adjusted positions to a boss 55 on the inner wall of the standard 2 by means of a screw 56 that engages in an arcuate slot 57 in the plate 53, the slot 57 having its center at the axis of the shaft 48 so as to provide angular adjustment of the plate about the axis of said shaft. The plate 54 is secured in angularly adjusted position to the plate 53 by means of a screw 58 passing through an arcuate slot 59 in the plate 54, the slot 59 being also centered at the axis of the shaft 48. The gear plate 54 carries a gear 60 that meshes with the gear 52 in all positions of adjustment of the plate 54 with respect of the plate 53. The plate 53 carries a gear 61 that is adapted to be meshed with the gear 60 and with change gear 62 on a fixed shaft 63 carried by the inner wall 55 of the standard 2. By adjusting the plates 53 and 54 about the axis of the shaft 48, a gear of any desired size may be substituted for the gear 62 to vary the speed ratio between the work spindle and the shaft 48.

The plate 54 has a gear 64 meshing with the gear 60 and so positioned with respect to the gears 52 and 61 that angular adjustment of the plate 54 with respect to the plate 53 will shift the gear 60 out of engagement with the gear 61 and bring the gear 64 into mesh with the gear 61 so as to reverse the direction of rotation of the work spindle.

A gear 62a on the shaft 63 meshes with a large gear 65 and the gear 65 in turn meshes with a gear 66 on the section 6 of the work spindle. The gear 66 is preferably rotatably mounted on the spindle section 6 in such manner that the spindle may be clutched thereto or released therefrom, a suitable clutch mechanism being provided for connecting or disconnecting the spindle from the driving mechanism so that the spindle may be manually adjusted to position the work with respect to the grinding wheel or other generating element before the machine is started into operation. Any suitable clutch mechanism may be provided. As herein shown, the gear 66 is rotatably mounted upon a sleeve 67 that is keyed to the spindle section 6, the gear being mounted between two clamping disks 68 and 69 slidably mounted on the sleeve 67.

The clamping of the gear is effected by means of a shiftable collar 70 on the sleeve 67 that is moved axially by means of radially movable balls 71 mounted between the outer end of the collar 70 and the inner end of a nut 72 that is secured in adjusted position on the sleeve 67 by means of a lock nut 73. The balls 71 when moved radially inwardly act on beveled faces 74 on the inner ends of the nut 72 and outer end of the collar 70 to force the collar 70 axially toward the gear 66 to clamp the gear 66 between the disks 68 and 69 by forcing the disks and gear against a flange 75 at the inner end of the sleeve 67.

The balls 71 are actuated by a sliding collar 76 that has a bore 77 that fits slidably upon the cylindrical nut 72 and a counterbore 78 that fits slidably upon the collar 70. Between the bore 77 and the counterbore 78 the collar 76 has a beveled shoulder 79 that is adapted to engage the balls 71 and force them radially inwardly between the nut 72 and collar 70 to force the collar 70 to clamping position. The clutch sleeve 76 is shifted by means of a suitable clutch lever 80 which when moved in one direction releases the spindle and when moved in the opposite direction clamps the driving gear 66 to the spindle. To afford convenient access to the spindle driving mechanism, the hollow standard 2 has a removable outer wall 81 that is detachably held in place by suitable bolts 82.

Within the base portion of the hollow standard 3 a shaft 83 is mounted in axial alinement with the shaft 48 and the shaft 83 is adapted to be connected to the shaft 48 or released therefrom by a suitable clutch mounted in a housing 84 adjacent the standard 3. The clutch within the housing 84 may be a clutch of the same type as the spindle clutch above described, being operated by a similar clutch lever 85 by means of which the shaft 83 may be connected to or disconnected from the shaft 48.

Within the hollow standard 3 the shaft 83 has a cam 86 keyed thereto and this cam is engaged by a roller 87 on the lower end of a vertically movable member 88 that is mounted for vertical travel within the standard 3. The member 88 has vertically spaced pairs of rollers 89 and 90 that travel in guide channels formed by a flat vertical detachable plate 91 that forms the inner wall of the standard 3 and internal shoulders 92 on the side walls of the standard. Rotation of the cam 86 imparts a vertical reciprocating movement to the member 88 and means is provided for imparting angular oscillations to the tailstock 5 upon reciprocation of the member 88. The tailstock 5 has an integral arm 93 that extends downwardly within the hollow standard 3 between the member 88 and the outer wall of the standard.

The arm 93 carries on its inner side a cam plate 94 that is connected to the arm 93 by a pivot 95. The cam plate 94 engages with a roller 96 carried by the member 88, the roller 96 being spaced from the plate 91 and having rolling engagement with the cam plate 94 during reciprocation of the member 88. A coil spring 97 interposed between the arm 93 and the outer wall of the standard 3 presses the arm 93 toward the vertically reciprocating member 88 and maintains engagement between the cam plate 94 and the rollers 96. A screw 98 in the arm 93 extends through a suitable opening in the outer wall of the standard 3 and bears against the outer face of the cam plate 94 above the pivot 95. The screw 98 is adapted to be turned manually to change the angle of the cam plate 94 with respect to the line of travel of the roller 96 and to vary the angle of oscillation of the tailstock 5. A spring 99 is interposed between the upper end of the vertically movable member 88 and the bottom of the tailstock 5 to maintain a downward thrust on the member 88 to insure engagement of the roller 87 with the cam 86 during downward movement of the member 88.

The shaft 83 is provided exteriorly of the standard 3 with a handwheel 100 by means of which it may be turned to adjust the cam 86 while the shaft 83 is disengaged from the shaft 48, and in order to enable the operator to correctly position the cam at the start of an operation, one or more marks 101 may be provided on the handwheel that may be registered with a mark 102 formed on a boss 103 on the wall of the standard 3.

A suitable dressing tool 104 for the grinding wheel may be mounted on the tailstock. This tool is carried by a fixture 105 that is clamped by means of a screw 106 to the center 13. The dressing tool 104 is adapted to be positioned to engage with the periphery of the grinding wheel while the carriage 21 is reciprocated to move the grinding wheel in a direction parallel to the center line of slide 21, the tailstock 5 being held in fixed position during the dressing operation.

In the operation of the machine the working holding section 7 with a tap clamped therein is attached to the fixed section 6 of the spindle and the center 13 is moved into engagement with the tap to clamp the work holding section between the center 13 and the attaching section 29. The clutch lever 80 is moved to a position to release the work spindle from its driving mechanism and the spindle is turned to position the work with the central portion of a flute facing the grinding wheel and substantially in horizontal alinement with the spindle axis as shown in Fig. 6, whereupon the lever 89 is shifted to clamp the spindle 7 to its driving mechanism. The clutch lever 85 is actuated to release the shaft 83 from the shaft 48 and the handwheel 100 is turned to position the marks 101 and 102 in alinement so that the roller 87 is engaged with the low point of the cam 86 and the center 13 is in its fully retracted position. The grinding wheel 16 is then adjusted to grinding position, the clutch lever 85 is operated to connect the shaft 83 to the shaft 48, and the machine is started into operation.

Assuming that the gearing has been adjusted to provide the proper ratio between the shaft 48 and the work spindle, the oscillations of the tailstock will be so timed with respect to the rotation of the work that the grinding wheel will successively engage with the tips of the cutting sections of the tap during rotation of the spindle, and each of the radially relieved peripheral faces of the taps will have been ground during a single revolution of the work spindle. The desired amount of radial relief is determined by the adjustment of the cam plate 94 and these adjustments can be quickly and easily made by means of the screw 98.

If a tap having a different number of flutes is to be ground a change gear 62 of the proper size will be mounted on the shaft 63 and the plates 53 and 54 will be adjusted to mesh the gear 61 with the gear 62. If a left-hand tap is to be ground the plate 54 is adjusted to bring the gear 64 into mesh with the gear 61 to reverse the direction of rotation of the work spindle.

While the invention is herein illustrated as applied to the grinding of peripheral faces of taps, it will be apparent that the invention may be applied to the grinding of relieved peripheral surfaces on angularly spaced portions of other workpieces. Furthermore, it will be readily understood that cutting elements other than a grinding wheel may be employed for generating the radially relieved peripheral surfaces of a workpiece.

It is to be understood that in accordance with the provisions of the patent statutes, variations and modifications of the specific devices herein shown and described may be made without departing from the spirit of the invention.

What I claim is:

1. A machine of the character described comprising a headstock, a jointed spindle having a section journaled in said headstock and a laterally movable work holding section, a flexible coupling connecting said spindle sections, a tailstock having a center for positioning the free end of said work holding spindle section, means mounting said tailstock for oscillating movement about an axis spaced laterally of said spindle, a cutting element mounted for movement into and out of work engaging position, means for driving said spindle, and means geared to said spindle driving means for oscillating said tailstock.

2. A machine of the character described comprising a headstock, a jointed spindle having a section journaled in said headstock and a laterally movable work holding section, a flexible coupling connecting said spindle sections, a tailstock having a center for positioning the free end of said work holding spindle section, means mounting said tailstock for oscillating movement about an axis spaced laterally of said spindle, a cutting element mounted for movement into and out of work engaging position, means for driving said spindle, means geared to said spindle driving means for oscillating said tailstock, a clutch for connecting and disconnecting said tailstock oscillating means from said driving means, and manually operable means for angularly adjusting said tailstock when said driving means is disconnected.

3. In a tap grinder, a headstock, a spindle journaled in said headstock and having a detachable tubular work holding section with an opening at its free end and an elongated slot inwardly of its free end, said slot and opening being of a size to permit a tap to be inserted into said tubular section of the spindle through said slot and to be advanced through said opening, a chuck carried by said tubular section at its free end, said chuck having jaws movable outwardly to permit passage of a tap and inwardly to clamp the shank of a tap, and a tailstock having a center for engagement with a tap clamped in said spindle.

4. In a machine of the character described, a headstock, a jointed spindle having a section journaled in the headstock and a laterally movable detachable work holding section, a flexible coupling forming a pivotal connection between said sections, a work holding chuck at the free end of said work holding section, a tailstock having a center engageable with work held by said chuck and mounted for pivotal movement about an axis spaced laterally from said center and substantially parallel to the axis of said center, means including a rotary cam for oscillating said tailstock about its pivotal axis, spindle driving means, and gearing connecting said cam to said spindle driving means for maintaining a predetermined speed ratio between the speeds of rotation of said spindle and cam.

5. In a machine of the character described, a supporting frame, work supporting means including an oscillatable member having a work engaging portion, said member being mounted on said frame for pivotal movement about an axis spaced from said work engaging portion, a member mounted for linear movement on said frame toward and away from said pivotal axis, means for reciprocating said linearly movable member, an arm fixed to said oscillatable member and positioned adjacent said linearly movable member, a cam plate on said arm engaging said linearly movable member and angularly disposed with respect to the line of movement thereof, means for yieldably pressing said arm toward said linearly movable member, and means for angularly adjusting said cam plate to vary the angle of oscillation of said oscillatable member.

6. In a machine of the character described, a supporting frame, work supporting means including an oscillatable member having a work engaging portion, said member being mounted on said frame for pivotal movement about an axis spaced from said work engaging portion, a member mounted for linear movement on said frame toward and away from said pivotal axis, a rotary cam engaging said linearly movable member for moving the same in one direction, a spring for holding said linearly movable member in engagement with said cam, an arm fixed to said oscillatable member and positioned adjacent said linearly movable member, a cam plate attached to said arm and engaging said linearly movable member, a spring acting on said arm to press the same toward said linearly movable member, and means for adjusting said cam plate angularly with respect to said arm to vary the angle of oscillation of said oscillatable member.

7. In a machine of the character described, a support, a work supporting member connected to said support to swing about a fixed axis, a member mounted for linear movement in said support toward and away from said pivotal axis, means including a rotary cam for reciprocating said member, an arm fixed to said supporting member, a spring pressing said arm toward said linearly movable member, a cam plate pivoted to said arm and engaging said linearly movable member, and means for adjusting said plate about its pivot to vary the angle of oscillation of said supporting member.

8. In a machine of the character described, a hollow standard having a vertical guide wall, a work supporting member mounted to swing about a horizontal axis parallel to said wall and adjacent the top of said standard, an arm fixed to said member and extending downwardly within the standard, a vertically disposed vertically movable member disposed between said arm and said wall and having spaced rollers engaging said wall, a rotary cam engaging the lower end of said vertically movable member, a spring pressing said vertically movable member downwardly against said cam, an intermediate roller mounted on said vertically movable member and spaced from said vertical wall, a cam plate carried by said arm and engaging the latter roller, a spring pressing said arm toward said vertically movable member, and means for angularly adjusting said cam plate to vary the amplitude of oscillation of said work supporting member.

9. In a machine of the character described a supporting frame having a fixed headstock, a spindle having a short section journaled in said headstock and an elongated section detachably coupled at one end to said short section and having a work holding chuck at its opposite end, a tailstock having a center for engagement with work held by said spindle, means mounting said tailstock for pivotal movement in said frame about an axis parallel to the axis of said center, means for driving said spindle, an actuating member mounted in said frame for linear reciprocation, means including a shaft geared to said spindle for reciprocating said actuating member, a cam plate mounted for angular adjustment in said tailstock and engaging said actuating member, and manually operable means for adjusting said plate to change its angle with respect to the line of movement of said actuating member so as to vary the amplitude of oscillation of said tailstock.

10. In a machine of the character described, a headstock, a jointed spindle having a section journaled in the headstock and a laterally movable detachable work holding section, a flexible coupling forming a pivotal connection between said sections, a work holding chuck at the free end of said work holding section, a tailstock having a center engageable with work held by said chuck, means mounting said tailstock for pivotal movement about an axis spaced laterally from said center and substantially parallel to the axis of said center, spindle driving means, and means including a shaft geared to said spindle driving means for oscillating said tailstock about its pivotal axis in timed relation with respect to the rotation of said spindle.

11. In a tap grinder, a headstock, a spindle journaled in said headstock and having an elongated tubular work holding portion projecting from said headstock, said tubular work holding portion having an opening at its free end and an elongated slot inwardly of its free end, said slot and opening being of a size to permit a tap to be inserted into said tubular section through said slot and to be advanced through said opening, a chuck carried by said tubular section at its free end, said chuck having jaws movable outwardly to permit passage of a tap and inwardly to clamp the shank of a tap and a tailstock having a center for engagement with a tap clamped in said spindle.

HENRY P. BOGGIS.

REFERENCES CITED

The following references are of record in the file of this patent:

UNITED STATES PATENTS

| Number | Name | Date |
| --- | --- | --- |
| 1,651,432 | Bath et al. | Dec. 6, 1927 |
| 1,739,753 | Flanders | Dec. 17, 1929 |
| 2,116,135 | Bath | May 3, 1938 |
| 2,187,227 | Flanders | Jan. 16, 1940 |
| 2,336,201 | Walker | Dec. 7, 1943 |
| 2,371,685 | Flanders | Mar. 20, 1945 |
| 2,389,401 | Andreasson | Nov. 20, 1945 |
| 2,413,436 | Dawson | Dec. 31, 1946 |